United States Patent Office 2,888,474
Patented May 26, 1959

2,888,474

$\Delta'$-ANDROSTEN-17$\beta$-OL-3-ONE HAVING AN 11$\beta$-HYDROXY OR AN 11-KETO GROUP AS WELL AS 17-ESTERS OF THESE DERIVATIVES AND 17$\alpha$-LOWER ALKYL DERIVATIVES THEREOF Howard J. Ringold and George Rosenkranz, Mexico City, Mexico, assignors to Syntex S.A., Mexico City, Mexico, a corporation of Mexico No Drawing. Application January 13, 1958
Serial No. 708,347

Claims priority, application Mexico January 18, 1957

9 Claims. (Cl. 260—397.45)

The present invention relates to cyclopentanophenanthrene compounds and to a process for the production thereof.

More particularly the present invention relates to novel $\Delta^1$-androsten-17$\beta$-ol-3-one derivatives having an 11$\beta$-hydroxy or an 11-keto group as well as 17-esters of these derivatives and 17$\alpha$-lower alkyl derivatives thereof. These compounds were all active androgenic type hormones having a pronounced anabolic effect and a minimum of androgenic activity.

In accordance with the present invention it has been discovered that the novel $\Delta^1$-androsten-17$\beta$-ol-3-one derivatives having an 11$\beta$-hydroxy group or an 11-keto group as well as those derivatives having in addition a 17$\alpha$-lower alkyl group may be prepared by treating the corresponding androstane compounds described and claimed in our U.S. application Serial No. 704,899, filed Dec. 24, 1957, with a dehydrogenating agent and especially selenium dioxide in t-butanol solution in the presence of a catalytic amount of acetic acid. Thereafter by conventional esterification there may be prepared the corresponding 17-esters of hydrocarbon carboxylic acids of 2 to 12 carbon atoms of the secondary 17-hydroxyl groups of the aforementioned compounds.

The novel compounds of the present invention may therefore be illustrated by the following formula:

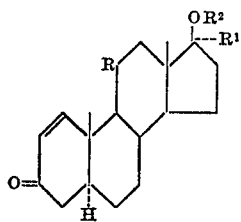

In the above formula R represents =O or —OH. R' represents hydrogen or lower alkyl such as methyl or ethyl, $R^2$ represents hydrogen when R' is lower alkyl and $R^2$ represents hydrogen or a hydrocarbon carboxylic acyl group of 2 to 12 carbon atoms when R' is hydrogen. These acyl groups may be saturated or unsaturated, straight or branched chain aliphatic, cyclic or mixed cyclic-aliphatic and may have the substituents conventional in steroid esters such as halogen or methoxy. Examples of these acyl groups are acetate, propionate, butyrate, hemisuccinate, caproate, benzoate, trimethylacetate, phenoxypropionate, cyclopentylpropionate and $\beta$-chloropropionate.

The novel compounds of the present invention may be prepared by a process illustrated by the following equation:

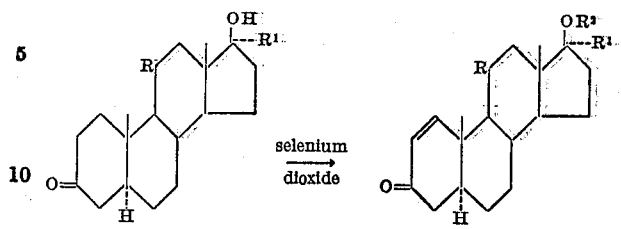

In the above equation R, R' and $R^2$ represent the same groups heretofore set forth.

In practicing the process above outlined the 11-oxygenated androstan-17$\beta$-ol-3-one derivative is preferably mixed with selenium dioxide and then covered with t-butanol containing a small amount of acetic acid. The reaction mixture is then heated under nitrogen atmosphere at a temperature of the order of 70° C. for about 8 hours. More selenium dioxide is then added and the mixture again heated for about 16 hours additional. The mixture is then cooled, the selenium separated and the solvent removed as by distillation under vacuum. The crude product thus prepared is then conventionally purified by chromatography to give the corresponding desired $\Delta^1$-compound. By conventional reaction with the corresponding acid anhydrides or acyl chlorides of the character set forth there was prepared the corresponding 17-esters of those products having secondary 17-hydroxy groups.

The following specific examples serve to illustrate but are not intended to limit the present invention.

*Example 1*

3 g. of androstan-17$\beta$-ol-3,11-dione was mixed with 1 g. of selenium dioxide, the mixture was covered with 60 cc. of t-butanol containing 0.6 cc. of acetic acid and then heated at 70° C. under an atmosphere of nitrogen for 8 hours. 1 additional gram of selenium dioxide was added and again heated under the same conditions for 16 hours further. The mixture was cooled, decanted from the selenium which had separated during the reaction, filtered through celite and then the solvent was removed by distillation under vacuum. The residue was subjected to chromatography in a column of 90 g. of neutral washed alumina, thus producing $\Delta^1$-androsten-17$\beta$-ol-3,11-dione.

1 g. of the above $\Delta^1$-androsten-17$\beta$-ol-3,11-dione was dissolved in 20 cc. of pyridine and treated with 1 cc. of acetic anhydride. The mixture was heated on the steam bath for 1 hour, poured into water, extracted with methylene dichloride and the extract was washed with dilute hydrochloric acid, sodium bicarbonate solution and water, dried over anhydrous sodium sulfate and evaporated to dryness. Crystallization of the residue from a mixture of acetone and hexane yielded the acetate of $\Delta^1$-androsten-17$\beta$-ol-3,11-dione.

By conventional reaction with other acid anhydrides or chlorides of hydrocarbon carboxylic acids of 2 to 12 carbons, including those specifically previously set forth herein there was obtained the corresponding 17-esters of $\Delta^1$-androsten-17$\beta$-ol-3,11-dione.

Following the same procedure just set forth except that the starting material was androstan-11$\beta$,17$\beta$-diol-3- one there was obtained the corresponding $\Delta^1$-androsten-11β,17β-diol-3-one and its esters.

*Example II*

1 g. of 17α-methyl-androstan-17β-ol-3,11-dione was dehydrogenated by exactly the same method described in the previous example. There was thus prepared 17α-methyl-$\Delta^1$-androsten-17β-ol-3,11-dione.

By the same method there was also prepared from 17α-methyl-androstan-11β,17β-diol-3-one the corresponding 17α-methyl-$\Delta^1$-androsten-11β,17β-diol-3-one and from 17α-ethyl-androstan-17β-ol-3,11-dione and 17α-ethyl-androstan-11β,17β-diol-3-one respectively 17α-ethyl-$\Delta^1$-androsten-17β-ol-3,11-dione and 17α-ethyl-$\Delta^1$-androsten-11β,17β-diol-3-one.

We claim:
1. A compound of the following formula:

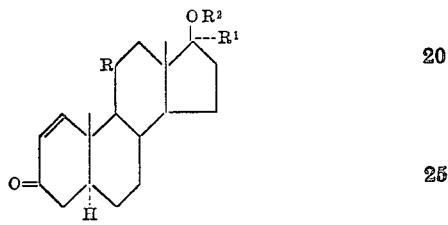

wherein R is selected from the group consisting of =O and —OH, R' is selected from the group consisting of hydrogen and a lower alkyl, $R^2$ is hydrogen when R' is alkyl and $R^2$ is selected from the group consisting of hydrogen and a hydrocarbon carboxylic acyl group of 2 to 12 carbon atoms when R' is hydrogen.

2. $\Delta^1$-androsten-17β-ol-3,11-dione.
3. The 17-hydrocarbon carboxylic acid esters of 2 to 12 carbon atoms of $\Delta^1$-androsten-17β-ol-3,11-dione.
4. $\Delta^1$-androsten-11β,17β-diol-3-one.
5. The 17-hydrocarbon carboxylic acid esters of 2 to 12 carbon atoms of $\Delta^1$-androsten-11β,17β-diol-3-one.
6. 17α-methyl-$\Delta^1$-androsten-17β-ol-3,11-dione.
7. 17α-ethyl-$\Delta^1$-androsten-17β-ol-3,11-dione.
8. 17α-methyl-$\Delta^1$-androsten-11β,17β-diol-3-one.
9. 17α-ethyl-$\Delta^1$-androsten-11β,17β-diol-3-one.

No references cited.